United States Patent
Yang

(10) Patent No.: US 10,216,913 B2
(45) Date of Patent: Feb. 26, 2019

(54) MOBILE DEVICE WITH BUILT-IN ACCESS CONTROL FUNCTIONALITY

(71) Applicant: Chien-Kang Yang, Taipei (TW)

(72) Inventor: Chien-Kang Yang, Taipei (TW)

(*) Notice: Subject to any disclaimer, the term of this patent is extended or adjusted under 35 U.S.C. 154(b) by 0 days.

(21) Appl. No.: 15/600,143

(22) Filed: May 19, 2017

(65) Prior Publication Data

US 2018/0211018 A1   Jul. 26, 2018

(30) Foreign Application Priority Data

Jan. 25, 2017 (TW) ............................. 106102831 A
Jan. 25, 2017 (TW) ............................. 106201380 U

(51) Int. Cl.
*G06F 21/31* (2013.01)
*H04W 12/02* (2009.01)
(Continued)

(52) U.S. Cl.
CPC .............. *G06F 21/31* (2013.01); *G06F 21/44* (2013.01); *G06F 21/62* (2013.01); *H04W 12/02* (2013.01);
(Continued)

(58) Field of Classification Search
CPC ...... G06F 21/31; G06F 21/50; G06F 21/6218; G06F 17/30286; G06F 21/6245;
(Continued)

(56) References Cited

U.S. PATENT DOCUMENTS 5,473,690 A * 12/1995 Grimonprez ......... G06Q 20/341
235/380
2003/0221115 A1* 11/2003 Itoh ........................ G06F 21/57
713/189
(Continued)

FOREIGN PATENT DOCUMENTS

CN     103902862 A    7/2014
EP       2840755 A1   2/2015
(Continued)

OTHER PUBLICATIONS

Dell™ OptiPlex™ FX160 Operating System Passwords by Dell, dated Oct. 2008.*
(Continued)

*Primary Examiner* — Daniel Lai
(74) *Attorney, Agent, or Firm* — Osha Liang LLP

(57) ABSTRACT

A mobile device includes an access control unit including a storage module and a control module, a memory unit storing an application program, and a processing unit connected to the aforementioned components. The processing unit executes the application program so as to transmit credential information to the access control unit for verification. When the application program is verified as authentic, the control module allows the processing unit to transmit an asserted user ID and an asserted user password thereto, looks up in a permissions table a user authority based on the asserted user ID, and enables the processing unit to operate the storage module based on the user authority, the asserted user ID, the asserted user password and an ID-password table.

12 Claims, 4 Drawing Sheets

(51) Int. Cl.
*G06F 21/44* (2013.01)
*H04W 12/04* (2009.01)
*H04W 12/06* (2009.01)
*G06F 21/62* (2013.01)
*H04W 88/02* (2009.01)

(52) U.S. Cl.
CPC ............ *H04W 12/04* (2013.01); *H04W 12/06* (2013.01); *G06F 2221/2141* (2013.01); *H04W 88/02* (2013.01)

(58) Field of Classification Search
CPC .... G06F 17/30289; G06F 21/60; G06F 21/62; G06F 21/6227; G06F 21/44; G06F 21/602; G06F 12/1408; G06F 21/72; G06F 21/78; G06F 2221/2107; G06F 21/71; G06F 21/74; G06F 21/79; G06F 2212/1052; G06F 3/0673; G06F 9/45558; G06F 13/16; G06F 21/606; G06F 2212/402; G06F 2221/2103; G06F 11/2094; G06F 12/1491; G06F 17/30309; G06F 17/30312; G06F 17/30675; G06F 2009/45587; G06F 21/10; G06F 21/445; G06F 21/45; G06F 21/572; G06F 21/6254; G06F 21/64; G06F 21/80; G06F 2221/2113; G06F 2221/2147; G06F 2221/2141; H04W 12/06; H04W 12/02; H04W 12/04; H04W 88/02; G06Q 20/409; G06Q 20/20; G06Q 20/32; G06Q 20/3226; G06Q 20/341; G06Q 20/325; G06Q 20/3278; G06Q 20/4014; G06Q 50/24; G06Q 20/3829; G06Q 20/3825; H04L 9/3247; H04L 63/0428; H04L 9/30; H04L 9/14; H04L 63/0442; H04L 63/08; H04L 9/0822; H04L 9/0894; H04L 9/0637; H04L 9/0861; H04L 9/3263; H04L 9/0866; H04L 63/083; H04L 63/0876; H04L 67/10; H04L 9/008; H04L 9/3226; H04L 2209/80; H04L 63/0435; H04L 63/0823; H04L 63/10; H04L 9/006; H04L 9/0825; H04L 9/32; H04L 9/3239; H04L 2209/805; H04L 63/045; H04L 63/06; H04L 63/12; H04L 63/123; H04L 63/168; H04L 63/18; H04L 67/02; H04L 67/1097; H04L 9/083; H04L 9/085; H04L 9/0863; H04L 9/3234; H04L 9/3271; H04L 51/16; H04L 63/126; H04L 67/12; H04L 9/0618; H04L 9/088; H04L 9/0897; H04L 2209/12; H04L 2463/062; H04L 2463/082; H04L 41/5051; H04L 45/745; H04L 51/046; H04L 63/102; H04L 63/105; H04L 67/306
See application file for complete search history.

(56) References Cited

U.S. PATENT DOCUMENTS

| | | | |
|---|---|---|---|
| 2006/0242151 | A1 | 10/2006 | Jogand-Coulomb et al. |
| 2010/0161928 | A1 | 6/2010 | Sela et al. |
| 2011/0113484 | A1 | 5/2011 | Zeuthen |
| 2013/0151858 | A1* | 6/2013 | Wang ................... H04L 9/0897 713/182 |
| 2013/0227652 | A1 | 8/2013 | Choi et al. |
| 2014/0020083 | A1 | 1/2014 | Fetik |
| 2015/0161591 | A1* | 6/2015 | Yang .................. G06Q 20/3278 235/379 |
| 2015/0200948 | A1 | 7/2015 | Cairns et al. |

FOREIGN PATENT DOCUMENTS

| | | |
|---|---|---|
| TW | 201638843 A | 11/2016 |
| TW | M1540328 U | 4/2017 |

OTHER PUBLICATIONS

Extended European Search Report issued in corresponding European Application No. 17177219.7 dated Aug. 24, 2017 (8 pages).
Search Report appended to an Office Action, which was issued to Taiwanese counterpart application No. 106102831 by the TIPO dated Apr. 23, 2018, with an English translation thereof. (4 pages).
Office Action issued in corresponding TW Application No. 106102831 and a Search Report appended to the Office Action dated Nov. 5, 2018 (15 pages).

* cited by examiner

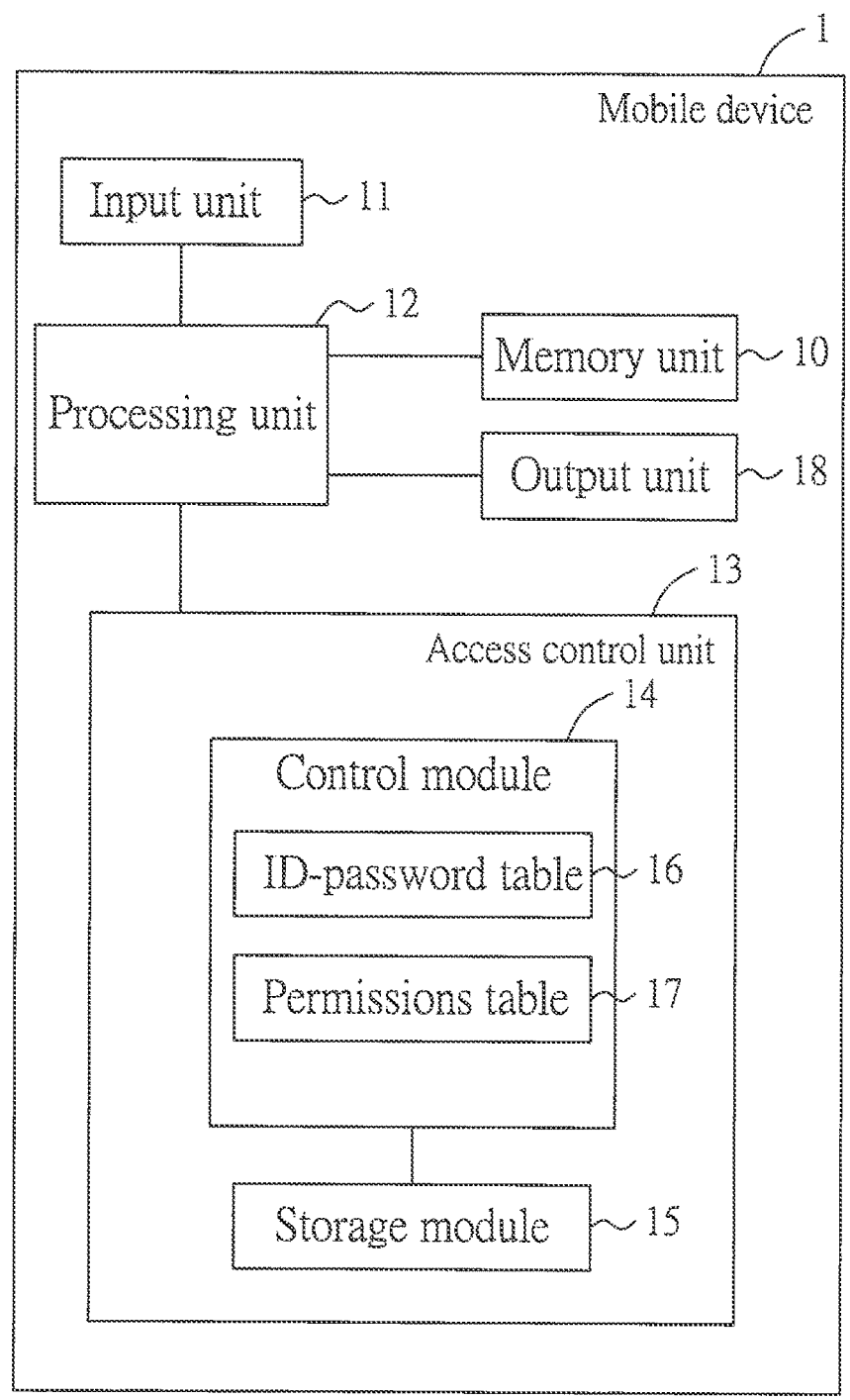
F I G. 1

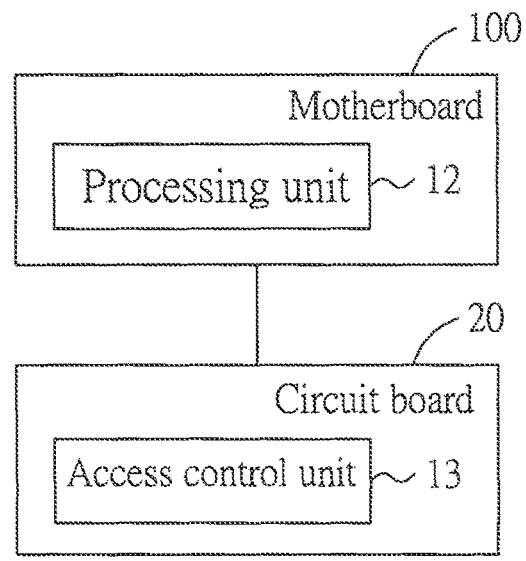
F I G. 5
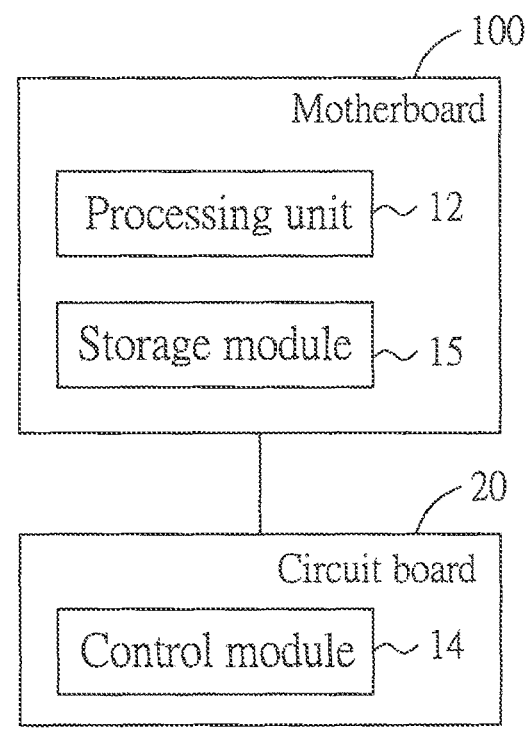
F I G. 6

MOBILE DEVICE WITH BUILT-IN ACCESS CONTROL FUNCTIONALITY

CROSS-REFERENCE TO RELATED APPLICATION

This application claims priorities of Taiwanese Patent Application Nos. 106102831 and 106201380, both filed on Jan. 25, 2017.

FIELD

The disclosure relates to a mobile device, and more particularly to a mobile device with built-in access control functionality.

BACKGROUND

A conventional mobile device, such as a smartphone, inserted with a Secure Digital (SD) memory card enables a user to make a payment via mobile payment. Taking Taiwanese Patent No. I537851 as an example, the conventional mobile device in combination with the SD memory card undergoes processes of verification and authorization so as to be utilized to make a payment according to information stored in the SD memory card.

SUMMARY

Therefore, an object of the disclosure is to provide a mobile device with built-in access control functionality that can alleviate at least one of the drawbacks of the prior art.

According to the disclosure, the mobile device includes an access control unit, a memory unit and a processing unit that is electrically connected to the access control unit and the memory unit.

The access control unit includes a storage module to which access is to be controlled, and a control module. The control module stores a permissions table and an ID-password table. The permissions table is configured to record a reference user identification (ID), and a user authority that corresponds to the reference user ID and that specifies what operation is allowed on the storage module. The ID-password table is configured to record the reference user ID and a reference user password that corresponds to the reference user ID.

The memory unit is configured to store an application program.

The processing unit is configured to execute instructions of the application program so as to transmit credential information associated with the application program to the access control unit in an attempt to gain access to the storage module.

When it is verified by the control module that the application program is authentic based on the credential information, the control module allows the processing unit to create data connection with the control module. The processing unit which executes the instructions of the application program is configured to transmit an asserted user ID and an asserted user password to the control module. The control module is configured to look up in the permissions table the user authority based on the asserted user ID, and to enable, when it is determined by the control module that the asserted user ID and the asserted user password conform respectively to the reference user ID and the reference user password in the ID-password table, the processing unit to perform the operation allowed on the storage module based on the user authority.

BRIEF DESCRIPTION OF THE DRAWINGS

Other features and advantages of the disclosure will become apparent in the following detailed description of the embodiment with reference to the accompanying drawings, of which:

FIG. 1 is a block diagram illustrating an embodiment of a mobile device with built-in access control functionality according to the disclosure;

FIG. 5 is a block diagram illustrating another embodiment of the mobile device in which the processing unit and the access control unit are mounted respectively on the motherboard and a circuit board electrically connected to the motherboard; and FIG. 6 is a block diagram illustrating still another embodiment of the mobile device, wherein the processing unit and the storage module are mounted on the motherboard, and the control module is mounted on the circuit board electrically connected to the motherboard.

DETAILED DESCRIPTION

Figure 2:
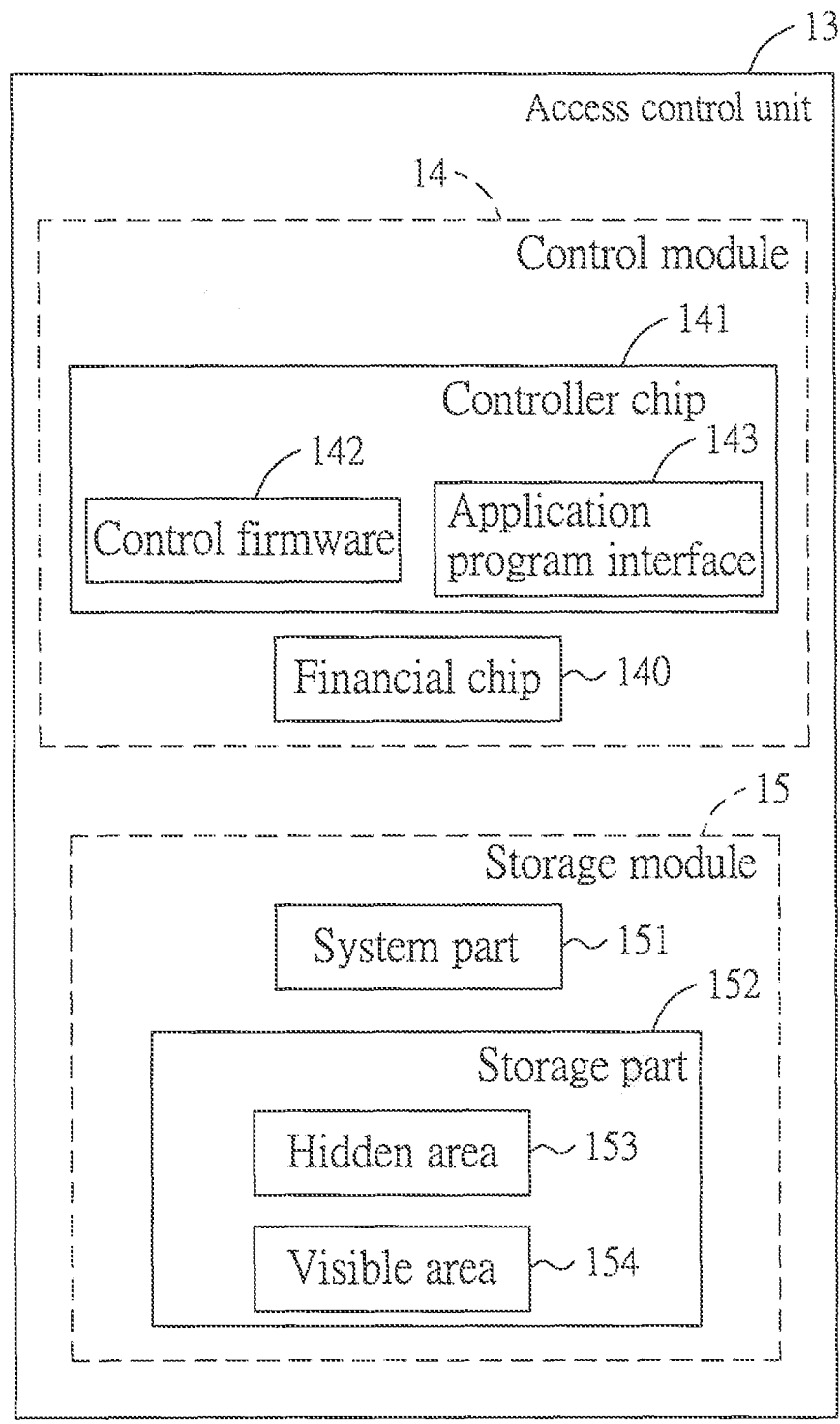
FIG. 2 is a block diagram illustrating an embodiment of an access control unit of the mobile device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a mobile device 1 with built-in access control functionality is illustrated. The mobile device 1 may be implemented by at least one of a smartphone, a tablet, or a notebook computer, but is not limited thereto. The mobile device 1 includes a memory unit 10, an input unit 11, an output unit 18, an access control unit 13, and a processing unit 12 that is electrically connected to the memory unit 10, the input unit 11, the output unit 13 and the access control unit 13.

The memory unit 10 is configured to store at least one application program. In this embodiment, the memory unit 10 may be implemented by at least one of a static random-access memory (SRAM) or a dynamic random access memory (DRAM), but is not limited thereto.

In this embodiment, the processing unit 12 may be implemented by at least one of an application processor (AP) or a central processing unit (CPU) of a computer, but is not limited thereto.

The input unit 11 is configured to be operated for input of an asserted user ID and an asserted user password, and to transmit the asserted user ID and the asserted user password to the processing unit 12. In this embodiment, the input unit 11 may be implemented by at least one of a keyboard or a touch panel, but is not limited thereto.

The output unit 18 is configured to be controlled by the processing unit 12 to display information. The output unit 18 may be implemented by at least one of a display or a touchscreen, but is not limited thereto.

The access control unit 13 includes a storage module 15 to which access is to be controlled, and a control module 14 which stores a signing program associated with a signing algorithm, a permissions table 17 and an ID-password table 16. The permissions table 17 is configured to record at least one reference user identification (ID), and at least one user authority that corresponds to the at least one reference user ID and that specifies what operation is allowed on the storage module 15 and/or the control module 14. The ID-password table 16 is configured to record the at least one reference user ID and at least one reference user password that corresponds to the at least one reference user ID. In this embodiment, the storage module 15 may be implemented by at least one of a flash memory, a hard disk drive (HDD) or a solid state disk (SSD), but is not limited thereto.

The processing unit 12 is configured to execute instructions of the application program stored in the memory unit 10 so as to transmit credential information associated with the application program to the access control unit 13 in an attempt to gain access to the storage module 15 therein. When it is verified by the control module 14 of the access control unit 13 that the application program is authentic based on the credential information, the control module 14 allows the processing unit 12 to create data connection with the control module 14. The processing unit 12 which executes the instructions of the application program is configured to transmit the asserted user ID and the asserted user password to the control module 14. The control module 14 is configured to look up in the permissions table 17 the user authority based on the asserted user ID by searching for a match in the at least one reference user identification (ID) for the asserted user ID and taking an entry of the user authority corresponding to the match, and to determine whether the asserted user ID and the asserted user password conform respectively to the reference user ID and the reference user password in the ID-password table 16. The control module 14 is configured to enable, when it is determined by the control module 14 that the asserted user ID and the asserted user password conform respectively to the reference user ID and the reference user password in the ID-password table 16, the processing unit 12 to perform the operation allowed on the storage module 15 based on the user authority thus looked up in the permissions table 17. As a result, authentication and authorization of a user may be realized so that the access to the storage module 15 is securely controlled.

In some embodiments, the data connect ion between the processing unit 12 and the control module 14 is utilized for transmitting the asserted user ID and the asserted user password, but is not limited thereto. In some embodiments, the data connection between the processing unit 12 and the control module 14 is utilized by the processing unit 12 to access the storage module 15 via the control module 14.

Specifically speaking, referring to FIG. 2 in combination with FIG. 1, the control module 14 of this disclosure includes a controller chip 141 which stores a control firmware 142 and an application program interface (API) 143. The permissions table 17 and the ID-password table 16 are stored in the control firmware 142. As shown in Table 1 below, an exemplary ID-password table 16 stores multiple reference user IDs (i.e., ID1, ID2 and ID3) and corresponding reference user passwords (i.e., CODE1, CODE2 and CODE3) for verifying identity of a user who intends to use the mobile device 1 to perform operations which require access to the storage module 15. It is worth noting that the at least one reference user password stored in the ID-password table 16 is encrypted so as to prevent password theft. Moreover, the control module 14 is configured to further store in the ID-password table 16 at least one reference program ID and at least one reference program password that are associated with the application program for verification as to whether the application program is authentic.

TABLE 1

| ID-password table | |
|---|---|
| ID1 | CODE1 |
| ID2 | CODE2 |
| ID3 | CODE3 |

The storage module 15 includes a system part 151 and a storage part 152. The system part 151 has built-in basic operation information. The storage part 152 includes a hidden area 153 and a visible area 154. The visible area 154 is allowed to be accessed by the processing unit 12 running an operating system (OS) so that the mobile device 1 can be used as a portable storage device (PSD). Taking the Android operating system as an example of the OS, the visible area 154 can be accessed by the processing unit 12 executing a file management program of the Android operating system, but the hidden area 153 is not allowed to be accessed by the processing unit 12 executing the same. That is to say, the processing unit 12 is prohibited from reading, writing or editing data stored in the hidden area 153. Only when certain authentication and authorization procedures have been completed successfully can the processing unit 12 execute the control firmware 142 stored in the controller chip 141 to access the hidden area 153. As a result, data stored in the hidden area 153 is unavailable for users until the authentication and authorization procedures have been completed successfully.

Referring to Table 2 below, an exemplary permissions table 17 stores the reference user IDs (i.e., ID1, ID2 and ID3) and corresponding user authorities. For example, the reference user ID ID1 corresponds to permissions to read and write data stored in the hidden area 153; the reference user ID ID2 corresponds to a permission to read data stored in the hidden area 153; the reference user ID ID3 corresponds to permissions to read, write and delete data stored in the hidden area 153. Therefore, the at least one user authority can be referred to so as to determine which operation (e.g., read, write and/or delete) on the data stored in the hidden area 153 is allowable for a specific user.

TABLE 2

| Permissions table | |
|---|---|
| ID1 | Read/Write |
| ID2 | Read |
| ID3 | Read/Write/Delete |

Specifically speaking, the hidden area 153 is configured to store a secret key corresponding to a virtual account to be used for mobile payment. Before making a mobile payment, the processing unit 12 executes the application program for mobile payment, and provides prompt information via the output unit 18 to request input of the asserted user ID and the asserted user password via the input unit 11. It should be noted that in some embodiments, the application program for mobile payment may utilize the asserted user ID and the asserted user password that are recorded in advance instead of requesting input of the same via the input unit 11. Thereafter, the processing unit 12 executing the application program is configured to transmit to the control module 14 the credential information, which includes an asserted program ID and an asserted program password, as well as the asserted user ID, the asserted user password, and data to be signed (i.e., to be subjected to the signing algorithm) that is associated with mobile payment.

The control module 14, after receiving the credential information, is configured to call the API 143 to determine whether the application program is authentic based on the ID-password table 16, the asserted program ID and the asserted program password, and to verify that the application program is authentic when the asserted program ID and the asserted program password conform respectively to the reference program ID and the reference program password stored in the ID-password table 16. Also, when it is verified by the control module 14 that the application program is authentic, the control module 14 allows the API 143 to be called to create the data connection between the processing unit 12 and the control module 14.

Additionally, after receiving the asserted user ID and the asserted user password, the control module 14 is configured to perform the authorization procedure by calling the API 143 to look up in the permissions table 17 the user authority (e.g., the permission to read data stored in the hidden area 153 which corresponds to the reference user ID ID2 as shown in table 2) based on the asserted user ID, and to perform the authentication procedure to determine whether the asserted user ID and the asserted user password conform respectively to the reference user ID and the reference user password in the ID-password table 16. When it is determined by the control module 14 that the user authority thus looked up allows access to the hidden area 153 and that the asserted user ID and the asserted user password conform respectively to the reference user ID and the reference user password in the ID-password table 16, the control module 14, after obtaining from the processing unit 12 the data to be signed, is configured to obtain the secret key stored in the hidden area 153 by executing the control firmware 142, to execute the signing program to generate a message authentication code (MAC) based on the data to be signed using the secret key, and to transmit the MAC to the processing unit 12 for further processing.

Moreover, in a variation of this embodiment, the control module 14 further includes a financial chip 140 that stores the signing program and the secret key which is provided by a financial institution issuing the financial chip 140. Similarly, to make a mobile payment, the previously mentioned authentication and authorization procedures are performed. When it is determined that the user authority thus looked up allows access to the financial chip 140 and that the asserted user ID and the asserted user password conform respectively to the reference user ID and the reference user password in the ID-password table 16, the control module 14, after obtaining from the processing unit 12 the data to be signed, is configured by executing the control firmware 142 in such a way that the financial chip 140 is provided with the data to be signed and executes the signing program to generate the MAC based on the data to be signed using the secret key. The control module 14 then transmits the MAC back to the processing unit 12 for further processing. Details of the financial chip 140 for mobile payment of this embodiment are, for example, disclosed in European Patent No. 2521081B1.

It should be noted that the previously mentioned authentication and authorization procedures are performed for mobile payment no matter if the control module 14 is implemented to include the financial chip 140.

In one case that the secret key to be used for implementing mobile payment by the mobile device 1 is stored in the hidden area 153, when the previously mentioned authentication and authorization procedures have been completed successfully, the control module 14 which has obtained from the processing unit 12 data to be signed is configured by executing the control firmware 142 to obtain the secret key stored in the hidden area 153, to execute the signing program stored in the control module 14 to generate the MAC based on the data to be signed using the secret key, and to transmit the MAC to the processing unit 12. Details of the above-mentioned case of mobile payment may be appreciated by referring to U.S. Patent publication No. US2014/0289121 A1.

In another case that the control module 14 includes the financial chip 140 which stores the signing program and that the secret key (provided by a financial institution other than that issuing the financial chip 140) to be used for implementing mobile payment by the mobile device 1 is stored in the hidden area 153, when the previously mentioned authentication and authorization procedures have been completed successfully, the control module 14 which has obtained from the processing unit 12 data to be signed is configured by executing the control firmware 142 to obtain the secret key stored in the hidden area 153, and is configured in such a way that the financial chip 140 is provided with the secret key and the data to be signed, and the financial chip 140 executes the signing program to generate the MAC based on the data to be signed using the secret key. The control module 14 then transmits the MAC to the processing unit 12.

In still another case that the control module 14 includes the financial chip 140 which stores the signing program and the secret key to be used for implementing mobile payment by the mobile device 1, when the previously mentioned authentication and authorization procedures have been completed successfully, the control module 14, after obtaining from the processing unit 12 the data to be signed, is configured by executing the control firmware 142 in such a way that the financial chip 140 is provided with the data to be signed, and the financial chip 140 executes the signing program to generate the MAC based on the data to be signed using the secret key. The control module 14 then transmits the MAC to the processing unit 12.

Consequently, the financial chip 140 may be implemented to be included in or be omitted from the control module 14 depending on needs.

Furthermore, the mobile device 1 of this disclosure realizes at least four functions of identity verification, access control, private resource management and personal information protection.

In the aspect of the function of personal identification, the hidden area 153 of the storage module 15 can be utilized to store user identity data that is associated with a user's identity. When the processing unit 12 executing the application program provides the access control unit 13 with the asserted user ID and the asserted user password, which may be inputted via the input unit 11 or obtained from a record saving the previously inputted asserted user ID and the asserted user password, and tries to access the user identity data, the API 143 is called by the control module 14 to determine whether the application program is authentic. When the application program is verified to be authentic and the control module 14 obtains the asserted user ID and the asserted user password, the control module 14 looks up in the permissions table 17 the user authority based on the asserted user ID, and determines whether the asserted user ID and the asserted user password conform respectively to the reference user ID and the reference user password in the ID-password table 16. The control module 14 is configured to enable the processing unit 12 to access the hidden area 153 of the storage module 15 and to obtain the user identity data stored therein by executing the control firmware 142 when it is determined by the control module 14 that the user authority thus looked up allows access to the hidden area 153 and that the asserted user ID and the asserted user password conform respectively to the reference user ID and the reference user password in the ID-password table 16. The user identity data thus obtained can be utilized for further application associated with personal identification.

In the aspect of the function of access control, the ID-password table 16 and the permissions table 17 can be stored in advance in the control firmware 142 by executing the API 143 before the mobile device 1 is released for use by users. The ID-password table 16 is configured to record the reference user IDs, each of which is associated with a user of the mobile device 1, and the reference user passwords, each of which corresponds to a respective one of the reference user IDs. The permissions table 17 is configured to record the reference user IDs and the user authorities, each of which corresponds to a respective one of the reference user IDs and specifies the operations (e.g., read, update, delete, etc.) allowed on the hidden area 153 of the storage module 15. Therefore, an effect that different users have different user authorities is realized.

In addition to data connection establishment and access control management, the API 143 can be called to personalize configurations of the access control unit 13. The function of personalization is called "Perso." Specifically speaking, after the application program is verified as authentic and the data connection is established by calling the API 143, the control module 14 enables the processing unit 12 to update the permissions table 17 and/or the ID-password table 16 when it is determined by the control module 14 that the user authority thus looked up allows updating the permissions table 17 and/or the ID-password table 16 (i.e., the authorization procedure) and that the asserted user ID and the asserted user password conform respectively to the reference user ID and the reference user password in the ID-password table 16 (i.e., the authentication procedure). Moreover, after the authentication and authorization procedures have been completed successfully, the control module 14 enables the storage part 152 of the storage module 15 to be partitioned into a plurality of sections (such as the hidden area 153 and the visible area 154 that are previously mentioned) according to needs, such that different types of data can be stored in different sections.

In the aspect of the function of private resource management, the control module 14 is configured to arrange storage spaces of the hidden area 153 in the storage module 15, and to enable the processing unit 12 to access the hidden area 153 of the storage module 15 only when it is determined by the control module 14 that the user authority thus looked up allows access to the hidden area 153 and that the asserted user ID and the asserted user password conform respectively to the reference user ID and the reference user password in the ID-password table 16. Specifically speaking, after the data connection between the application program currently executed by the processing unit 12 and the API 143 of the control module 14 is created, and after the authentication and authorization procedures have been completed successfully, the control module 14, according to commands issued from the application program, enables the processing unit 12 to establish, via the control module 14, a plurality of private spaces in the hidden area 153 by calling the API 143 to perform the function of Perso such that different types of private data (e.g., mobile payment related information, personal health record, various kinds of certificates, and so on) can be stored in the plurality of private spaces, respectively. Furthermore, the control module 14 is configured to assign in the permissions table 17 the user authorities for accessing the private spaces respectively to the reference user IDs.

In the aspect of the function of personal information protection, the API 143 of the control module 14 includes functions of encryption and decryption, which may be implemented by at least one of Triple Data Encryption Algorithm (3DES), Advanced Encryption Standard (AES) or RSA algorithm, so as to encrypt or decrypt data. For example, after the data connection has been established between the application program currently being executed by the processing unit 12 and the API 143 of the control module 14, and after the authentication and authorization procedures have been completed successfully (i.e., the user authority thus looked up allows access to at least one of said plurality of private spaces), the control module 14 is configured to enable the processing unit 12 to access said at least one of the plurality of private spaces, such that the control module 14 is capable of calling the API 143 to encrypt data, which may be related to personal information, obtained from the processing unit 12, and calling the control firmware 142 to store the data thus encrypted in the at least one of the plurality of private spaces, and is further capable of calling the API 143 to decrypt data obtained from the at least one of the plurality of private spaces and calling the control firmware 142 to transmit the data thus decrypted to the processing unit 12.

Figure 3:
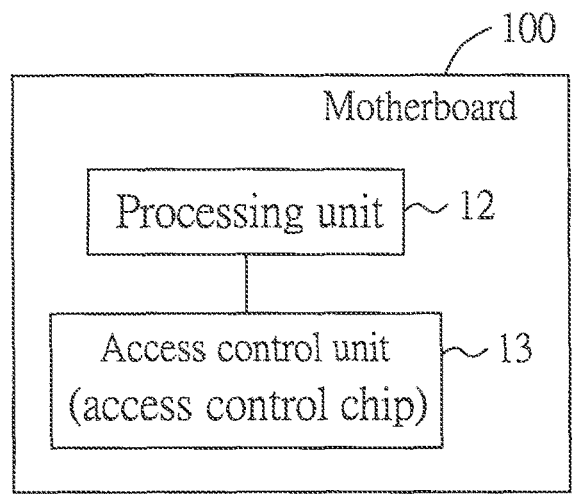
FIG. 3 is a block diagram illustrating an embodiment where a processing unit and the access control unit are mounted on a motherboard of the mobile device.

Referring to FIG. 3, in some embodiments, the mobile device 1 (see FIG. 1) further includes a motherboard 100. The processing unit 12 is mounted on the motherboard 100. The access control unit 13 is implemented by an access control chip mounted on the motherboard 100.

Figure 4:
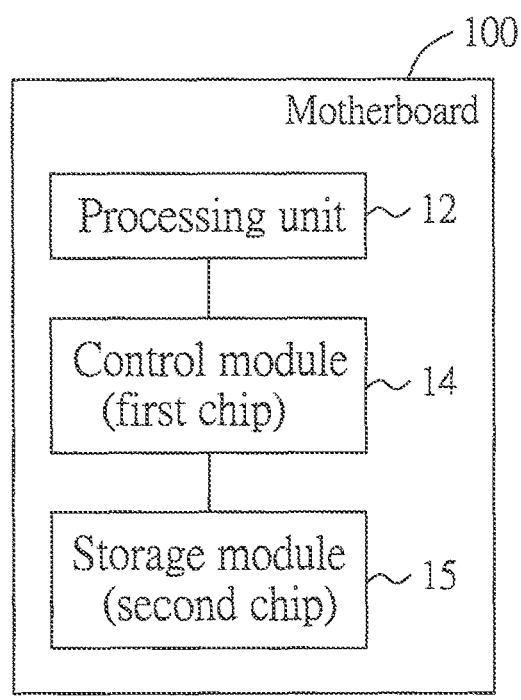
FIG. 4 is a block diagram illustrating an embodiment of the mobile device in which the processing unit, and a control module and a storage module of the access control unit are mounted separately on the motherboard.

Referring to FIG. 4, in some embodiments, the mobile device 1 (see FIG. 1) further includes the motherboard 100. The processing unit 12 is mounted on the motherboard 100. The control module 14 is implemented by a first chip mounted on the motherboard 100, and the storage module 15 is implemented by a second chip mounted on the motherboard 100.

Referring to FIG. 5, in some embodiments, the mobile device 1 (see FIG. 1) further includes the motherboard 100 and a circuit board 20 that is electrically connected to the motherboard 100. The processing unit 12 is mounted on the motherboard 100. The access control unit 13 is implemented by the access control chip mounted on the circuit board 20.

Referring to FIG. 6, in some embodiments, the mobile device 1 (see FIG. 1) further includes the motherboard 100 and the circuit board 20 that is electrically connected to the motherboard 100. The processing unit 12 is mounted on the motherboard 100. The control module 14 is implemented by the access control chip mounted on the circuit board 20. The storage module 15 is implemented by a storage chip mounted on the motherboard 100.

It should be noted that the chips mentioned above may be implemented by integrated circuits (ICs) designed and fabricated to carry out corresponding functionalities.

In summary, in the mobile device 1 of this disclosure, access by the processing unit 12 to the storage module 15, especially to the hidden area 153, is controlled via the built-in access control unit 13. In addition, the access control unit 13 can be implemented by a single chip (i.e., the access control chip) or by two separate chips (i.e., the first and second chips), and can be implemented to be mounted on the same board (i.e., the motherboard 100) with the processing unit 12 or mounted separately on different boards (i.e., the motherboard 100 and the circuit board 20) as the processing unit 12.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A mobile device with built-in access control functionality comprising:
   an access control unit that includes
   a storage module to which access is to be controlled, and
   a control module storing
   a permissions table configured to record a reference user identification (ID), and a user authority that corresponds to the reference user ID and that specifies what operation is allowed on said storage module, and
   an ID-password table configured to record the reference user ID and a reference user password that corresponds to the reference user ID;
   a memory unit that is configured to store an application program; and
   a processing unit that is electrically connected to said access control unit and said memory unit, and that is configured to execute instructions of the application program so as to transmit credential information associated with the application program to said access control unit in an attempt to gain access to said storage module;
   wherein when it is verified by said control module that the application program is authentic based on the credential information, said control module allows said processing unit to create data connection with said control module;
   wherein said processing unit which executes the instructions of the application program is configured to transmit an asserted user ID and an asserted user password to said control module;
   wherein said control module is configured
   to look up in the permissions table the user authority based on the asserted user ID,
   to enable, when it is determined by the control module that the asserted user ID and the asserted user password conform respectively to the reference user ID and the reference user password in the ID-password table, said processing unit to perform the operation allowed on said storage module based on the user authority,
   to arrange storage spaces of a hidden area in said storage module,
   to enable said processing unit to establish, via said control module, a plurality of private spaces in said hidden area,
   to enable said processing unit to access said hidden area of said storage module when it is determined by said control module that the user authority thus looked up allows access to said hidden area and that the asserted user ID and the asserted user password conform respectively to the reference user ID and the reference user password in the ID-password table, and
   to enable, when it is determined by said control module that the user authority thus looked up allows access to at least one of said plurality of private spaces and that the asserted user ID and the asserted user password conform respectively to the reference user ID and the reference user password in the ID-password table, said processing unit to access said at least one of said plurality of private spaces, such that said control module is capable of encrypting data obtained from said processing unit and storing the data thus encrypted in said at least one of said plurality of private spaces, and is capable of decrypting data obtained from said at least one of said plurality of private spaces and transmitting the data thus decrypted to said processing unit.

2. The mobile device as claimed in claim 1, wherein said control module is configured to store a reference program ID and a reference program password that are associated with the application program, and to verify that the application program is authentic when an asserted program ID and an asserted program password included in the credential information conform respectively to the reference program ID and the reference program password.

3. The mobile device as claimed in claim 1, wherein:
   said hidden area is configured to store a secret key; and
   said control module stores a signing program, obtains from said processing unit data to be signed, and is configured to, when it is determined by said control module that the user authority thus looked up allows access to said hidden area and that the asserted user ID and the asserted user password conform respectively to the reference user ID and the reference user password in the ID-password table, obtain the secret key stored in said hidden area, execute the signing program to generate a message authentication code (MAC) based on the data to be signed using the secret key, and transmit the MAC to said processing unit.

4. The mobile device as claimed in claim 1, wherein:
   said hidden area is configured to store a secret key; and
   said control module includes a financial chip that stores a signing program, obtains from said processing unit data to be signed, and is configured to, when it is determined that the user authority thus looked up allows access to said hidden area and said financial chip and that the asserted user ID and the asserted user password conform respectively to the reference user ID and the reference user password in the ID-password table, obtain the secret key stored in said hidden area, such that said financial chip is provided with the secret key and the data to be signed and executes the signing program to generate a message authentication code (MAC) based on the data to be signed using the secret key, said control module transmitting the MAC to said processing unit.

5. The mobile device as claimed in claim 1, wherein said control module is configured to enable said processing unit to update the permissions table and/or the ID-password table when it is determined by said control module that the user authority thus looked up allows updating the permissions table and/or the ID-password table and that the asserted user ID and the asserted user password conform respectively to the reference user ID and the reference user password in the ID-password table.

6. The mobile device as claimed in claim 1, further comprising an input unit that is electrically connected to said processing unit and that is configured to be operated to input the asserted user ID and the asserted user password, and to transmit the asserted user ID and the asserted user password to said processing unit.

7. The mobile device as claimed in claim 1, wherein said control module includes a financial chip that stores a secret key and a signing program, obtains from said processing unit data to be signed, and is configured in such a way that, when it is determined that the user authority thus looked up allows access to said financial chip and that the asserted user ID and the asserted user password conform respectively to the reference user ID and the reference user password in the ID-password table, said financial chip is provided with the data to be signed and executes the signing program to generate a message authentication code (MAC) based on the data to be signed using the secret key, and to transmit the MAC to said processing unit.

8. The mobile device as claimed in claim 1, further comprising a motherboard, wherein:
said processing unit is mounted on said motherboard; and
said access control unit is implemented by an access control chip mounted on said motherboard.

9. The mobile device as claimed in claim 1, further comprising a motherboard, wherein:
said processing unit is mounted on said motherboard;
said control module is implemented by a first chip mounted on said motherboard; and
said storage module is implemented by a second chip mounted on said motherboard.

10. The mobile device as claimed in claim 1, further comprising a motherboard and a circuit board that is electrically connected to said motherboard, wherein:
said processing unit is mounted on said motherboard; and
said access control unit is mounted on said circuit board.

11. The mobile device as claimed in claim 1, further comprising a motherboard and a circuit board that is electrically connected to said motherboard, wherein:
said processing unit is mounted on said motherboard;
said control module is mounted on said circuit board; and
said storage module is mounted on said motherboard.

12. The mobile device as claimed in claim 1, wherein said mobile device is implemented by at least one of a smartphone, a tablet, or a notebook computer.

* * * * *